(12) United States Patent
Hunter et al.

(10) Patent No.: US 9,970,795 B2
(45) Date of Patent: May 15, 2018

(54) METHOD FOR FLOW MEASUREMENT USING A MAGNETIC-INDUCTIVE FLOWMETER

(71) Applicant: KROHNE AG, Basel (CH)

(72) Inventors: Martijn Hunter, Barendrecht (NL); Josef Neven, Mours St. Eusebe (FR); Christian Paul, Rotterdam (NL); Christoph Spiegel, Oberhausen (DE)

(73) Assignee: Krohne AG, Basel (CH)

( * ) Notice: Subject to any disclaimer, the term of this patent is extended or adjusted under 35 U.S.C. 154(b) by 48 days.

(21) Appl. No.: 15/355,252

(22) Filed: Nov. 18, 2016

(65) Prior Publication Data

US 2017/0146376 A1 May 25, 2017

(30) Foreign Application Priority Data

Nov. 19, 2015 (DE) .......................... 10 2015 120 103

(51) Int. Cl.
*G01F 1/58* (2006.01)
*G01F 1/60* (2006.01)
*G01F 25/00* (2006.01)

(52) U.S. Cl.
CPC ................ *G01F 1/588* (2013.01); *G01F 1/58* (2013.01); *G01F 1/60* (2013.01); *G01F 25/0007* (2013.01)

(58) Field of Classification Search
CPC ........................................................ G01F 1/588
USPC ........................................................ 73/861.12
See application file for complete search history.

(56) References Cited

U.S. PATENT DOCUMENTS

| 5,402,685 | A | 4/1995 | Brobeil | |
|---|---|---|---|---|
| 7,293,468 | B2 * | 11/2007 | Ishikawa | ................. G01F 1/586 |
| | | | | 73/861.12 |
| 7,369,949 | B2 | 5/2008 | Yamamoto | |
| 8,037,774 | B2 * | 10/2011 | Yamamoto | .............. G01F 1/584 |
| | | | | 73/861.12 |
| 8,047,080 | B2 | 11/2011 | Ishikawa et al. | |
| 2007/0088511 | A1 | 4/2007 | Yamamoto | |
| 2008/0282766 | A1 | 11/2008 | Ishikawa et al. | |

FOREIGN PATENT DOCUMENTS

EP 1970675 A2 9/2008

\* cited by examiner

*Primary Examiner* — Jewel V Dowtin
(74) *Attorney, Agent, or Firm* — David S. Safran

(57) ABSTRACT

A method for flow measurement using a magnetic-inductive flowmeter with a measuring tube and magnetic field generator that allows for detection of a zero flow error is achieved in that the measuring tube is filled with a first medium, the strength of the magnetic field is measured over a first measuring interval and a derivative with respect to time of the measured strength of the magnetic field is determined for the first measuring interval, that a second medium is made to flow through the measuring tube, the strength of the magnetic field is measured over a second measuring interval and a derivative with respect to time of the measured strength of the magnetic field is determined for the second measuring interval, that a deviation of the derivative for the second measuring interval from the derivative for the first measuring interval is determined, and assigned to a zero flow error.

10 Claims, 2 Drawing Sheets

METHOD FOR FLOW MEASUREMENT USING A MAGNETIC-INDUCTIVE FLOWMETER

BACKGROUND THE INVENTION

Field of the Invention

The invention relates to a method for flow measurement using a magnetic-inductive flowmeter with a measuring tube and a magnetic field generator, wherein a magnetic field is generated by the magnetic field generator and wherein the magnetic field is inverted at inverting intervals.

Description of Related Art

A magnetic-inductive flowmeter of this type measures the flow of a medium through the measuring tube, wherein the measuring tube is normally completely filled with the medium. For this, the magnetic field is generated by the magnetic field generator in such a manner that the magnetic field at least partially permeates the medium located in the measuring tube and a flow of the medium through the measuring tube induces an induction voltage in the medium. The induction voltage is thereby proportional to the magnetic flux density of the magnetic field in the medium. Normally, the magnetic field generator has an electromagnet with a coil for generating the magnetic field and with a yoke for guiding the magnetic field. The induction voltage is proportional to a flow velocity of the medium through the measuring tube and, from the flow velocity, a volume flow of the medium through the measuring tube is determined using e.g., an inner cross sectional area of the measuring tube or a mass flow of the medium through the measuring tube is determined additionally using a density of the medium. The flow of the medium through the measuring tube thus relates both to the volume flow as well as to the mass flow of the medium through the measuring tube.

Inversion of the magnetic field takes place, in each case, within one of the inverting intervals and corresponds to a reversal of the direction of the magnetic field. Accordingly, the strength of the magnetic field in the respective inverting interval is initially transient and then constant after settling. Such a magnetic field is also called a switched or a clocked constant magnetic field. When an electromagnet generates the magnetic field using a coil, a switched magnetic field is, e.g., generated in that a constant current is applied in the coil and the direction of the current is reversed after inverting intervals.

The flow velocity of a medium through the measuring tube is mostly different from zero, however can be zero, so that the medium is stagnant in the measuring tube. A measured flow for a medium stagnant in the measuring tube is also called zero flow. If a medium is stagnant in the measuring tube and if the measured zero flow is not equal to zero, the measured zero flow is also called zero flow error. A flow that is measured at a flow velocity different than zero is superimposed with the zero flow error, whereby the measuring accuracy of the flow is decreased.

A magnetic-inductive flowmeter is known from European Patent Application EP 1 970 675 A2 and corresponds U.S. Pat. No. 8,047,080 B2, which is designed to measure zero flows of a medium, to determine a deviation from subsequently measured zero flows and, if the deviation exceeds a predetermined value range, to indicate the exceedance. It is known from U.S. Pat. No. 5,402,685, to equip magnetic-inductive flowmeters with a calibrating and zero-balancing arrangement. U.S. Pat. No. 7,369,949 B2 proposes different methods for improving the measuring accuracy of magnetic-inductive flowmeters.

Methods for flow measurement are known from the prior art using a magnetic-inductive flowmeter of the generic kind, in the implementation of which, a flow of a medium through the measuring tube is measured and wherein the measured flow can deviate from the actual flow of the medium by a zero flow error that cannot be detected by the method.

SUMMARY OF THE INVENTION

Thus, the object of the invention is to provide a method for flow measurement that makes a detection of the zero flow error possible.

The method according to the invention, in which the above derived and described object is achieved, is initially and essentially characterized by the following method steps:

In a first method step, the measuring tube is completely filled with a first medium, wherein the first medium is stagnant in the filled measuring tube. The first medium is, e.g., water or another medium that is suitable for flow measurement using magnetic-inductive flowmeters. Then, the strength of the magnetic field is measured over a first measuring interval and a derivative with respect to time of the measured strength of the magnetic field is determined for the first measuring interval. The first method step is preferably implemented during a calibration of the magnetic-inductive flowmeter. Normally, the calibration is carried out before installation of a magnetic-inductive flowmeter at its operating site.

In a second method step, a second medium is made to flow through the measuring tube. Thereby, the strength of the magnetic field is measured over a second measuring interval and a derivative with respect to time of the measured strength of the magnetic field is determined for the second measuring interval. The second medium is either identical to the first medium or it is another medium that is suitable for flow measurement for magnetic-inductive flowmeters. The second medium also completely fills the measuring tube. A second medium stagnant in the measuring tube is deemed as flow of the second medium through the measuring tube.

In a third method step, a first derivative deviation of the derivative for the second measuring interval from the derivative for the first measuring interval is determined. The first derivative deviation can be, e.g., a difference between the derivative for the second measuring interval and the derivative for the first measuring interval.

In the fourth method step, the determined first derivative deviation is assigned to a zero flow error.

The method steps following the first method step are normally carried out at the operating site of the magnetic-inductive flowmeter, wherein medium is made to flow through the measuring tube at the operating site. However, the first method step can also be implemented at the operating site, when it is guaranteed that the medium is stagnant in the measuring tube.

Each measuring interval is thereby arranged, in each case, in one of the inverting intervals in such a manner that the strength of the magnetic field is transient in the respective measuring interval. This guarantees that derivatives in respect to time of the measured strength of the magnetic field are different than zero.

According to the invention, a clear relationship between a stabilization of the strength of the magnetic field and a measured zero flow has been identified during an intensive study of zero flow effects on media stagnant in the measuring tube of a magnetic-inductive flowmeter of a generic type. In the study, the zero flow was measured over complete inverting intervals. Thereby, a strong correlation was identified between the derivative in respect to time of the strength of the magnetic field and the measured flow velocity. The derivative in respect to time of the strength of the magnetic field is a new characteristic curve of a magnetic-inductive flowmeter, which characterizes the magnetic-inductive flowmeter. The characteristic curve is, for example, stored in the magnetic-inductive flowmeter for use in methods. It has been discovered that deviations from the characteristic curve correspond to a zero flow error. Deviations from this characteristic curve emerge during operation of a magnetic-inductive flowmeter, e.g., when properties of the magnetic-inductive flowmeter change over time. If the magnetic field, e.g., is generated using an electromagnet with a yoke and a driver circuit for supplying the electromagnet with an electric current, the properties e.g., of the yoke and/or the driver circuit change over time.

The method according to the invention has the advantage over the method known from the prior art that zero flow errors are detected. It can be implemented, in particular, in addition to the method for flow measurement using a magnetic-inductive flowmeters of a generic type known from the prior art. In detecting zero flow errors, changes in the properties of the magnetic-inductive flowmeter are also detected.

Since the magnetic field is inverted after inverting intervals, it is provided in one implementation of the method according to the invention that the first measuring interval and the second measuring interval each correspond to one of the inverting intervals. Accordingly, the duration of the first measuring interval corresponds to the duration of one of the inverting intervals and the duration of the second measuring interval corresponds to the duration of another one of the inverting intervals. The implementation of the method according to the invention is simplified by having the first measuring interval and the second measuring interval each correspond to one of the inverting intervals.

The method according to the invention can be carried out using the assignment of the first derivative deviation to the zero flow error in alternative manners different to one another.

It is provided in one implementation that a flow of the second medium through the measuring tube is measured in a second measuring interval and the measured flow is corrected by the zero flow error. The zero flow error is corrected, e.g., in that the zero flow error is subtracted from the measured flow. This allows for the effect of the first derivative deviation to be compensated in a simple manner.

In an implementation alternative to the above implementations, it is provided that the strength of the magnetic field is measured over a third measuring interval and a derivative in respect to time of the measured strength of the magnetic field is determined for the third measuring interval. Then, a second derivative deviation for the third interval from the derivative for the first measuring interval is determined. Furthermore, in the third measuring interval, a flow of the second medium through the measuring tube is measured. Thereby, the strength of the magnetic field in the third measuring interval is adjusted so that the second derivative deviation is at least reduced in comparison to the first derivative deviation. In this implementation, the effect of the first derivative deviation is not compensated, but the cause for the first derivative deviation is reduced, so that the flow through the measuring tube measured in the third measuring interval has at least a reduced zero flow error.

It is provided in a further alternative implementation that the strength of the magnetic field is measured over a third measuring interval and a derivative in respect to time of the measured strength of the magnetic field is determined for the third measuring interval. Then, a second derivative deviation of the derivative for the third measuring interval from the derivative for the first measuring interval is determined. Further, a flow of the second medium through the measuring tube is measured in the third measuring interval, a flow of the second medium through the measuring tube is measured in the second measuring interval, and an average of the flow measured in the second measuring interval and the flow measured in the third measuring interval is determined. The strength of the magnetic field in the third measuring interval is thereby adjusted so that the second derivative deviation corresponds to the inverted first derivative deviation. The zero flow error superimposes both the flow measured in the second as well as in the third measuring interval and is also inverted by inverting the first derivative deviation in the third measuring interval. In determining the average from the flow measured in the second and in the third measuring interval, the zero flow error is thus compensated.

If the magnetic field, e.g., is generated by an electromagnet with a yoke and a driver circuit for supplying the electromagnet with an electric current, the cause for the derivative deviation is, e.g., a change in the properties of the yoke over time, i.e., aging of the yoke. The strength of the magnetic field, in this example, is determined using the amount of current generated by the driver circuit, so that, by changing the current in a third measuring interval, the second derivative deviation is reduced or inverted according to the two previous implementations.

Since the magnetic field is inverted after the inverting intervals, it is not only advantageous when both the first interval, as well as the second interval, each correspond to one of the inverting intervals, but it is also advantageous when the third measuring interval corresponds to another one of the inverting intervals.

In a further implementation of the method, it is provided that the inverting intervals are constant. The inverting intervals are constant when their durations are identical. Constant inverting intervals simplify the implementation of the method according to the invention.

Either a magnetic field strength or a magnetic flux density of the magnetic field is deemed as the strength of the magnetic field.

It is provided in one implementation that a magnetic field strength of the magnetic field is measured by a Hall Effect sensor and that the measured magnetic field strength is deemed as the strength of the magnetic field or the strength of the magnetic field is determined from the measured magnetic field strength. For example, the magnetic flux density is deemed as the strength of the magnetic field and the magnetic flux density in the medium is determined from the magnetic field strength using the permeability of the medium.

In an implementation alternative to the previous implementation, it is provided that a temporal change of a magnetic flux density of the magnetic field is measured by a measuring coil and that the measured temporal change of the magnetic flux density is deemed as the measurement of the strength of the magnetic field and as derivative in respect to time of the strength of the magnetic field. Accordingly, the use of the measuring coil is advantageous, in particular, when the magnetic flux density of the magnetic field is deemed as the strength of the magnetic field, because the measuring coil directly measures the temporal derivative of the magnetic flux density and thereby the measurement of the strength of the magnetic field and the derivative in respect to time of the strength of the magnetic field coincide.

In detail, there is a plurality of possibilities for designing and further developing the method according to the invention as will be apparent from the following description of a preferred embodiment in conjunction with the accompanying drawings.

DETAILED DESCRIPTION OF THE INVENTION

Figure 1:
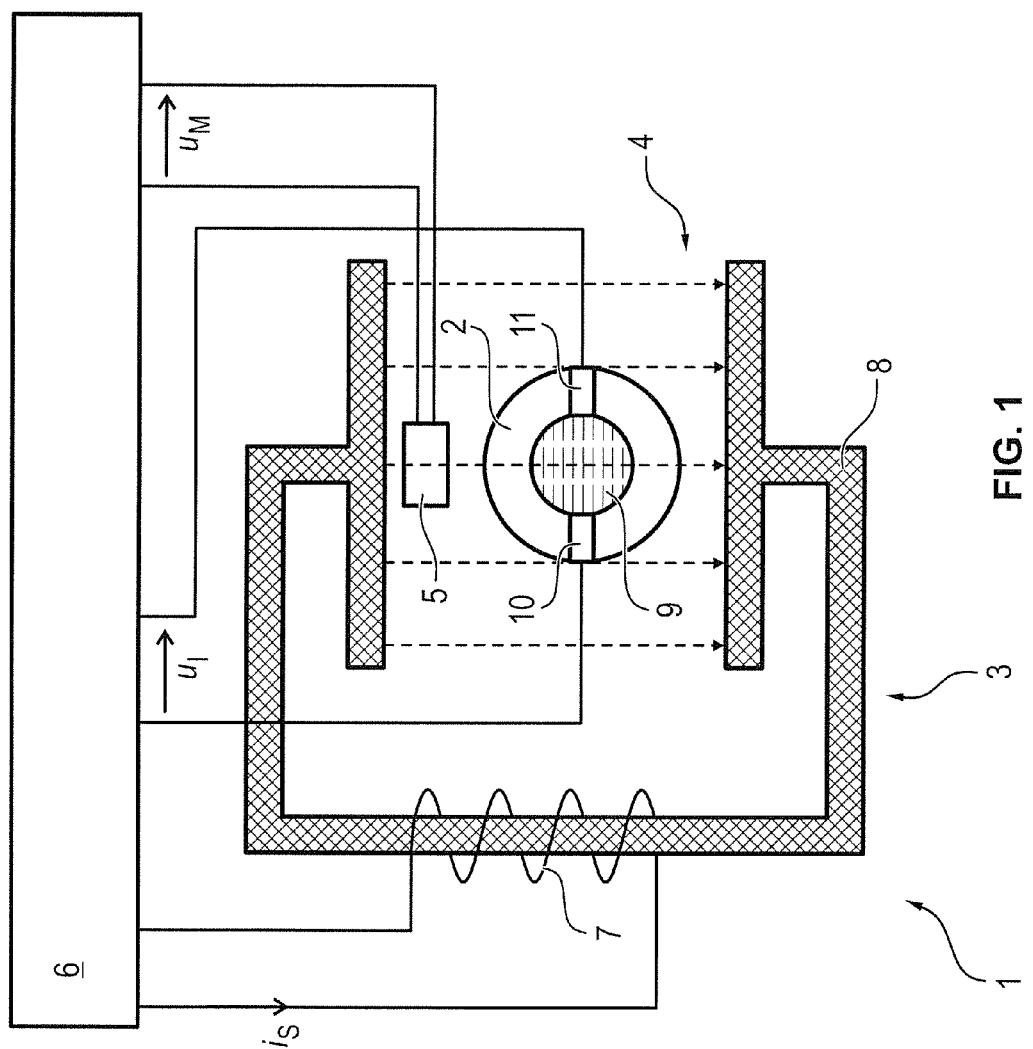
FIG. 1 shows an embodiment of a magnetic-inductive flowmeter in regular operation and FIG. 2 is a flow chart of a method for flow measurement for the magnetic-inductive flowmeter.

FIG. 1 shows the magnetic-inductive flowmeter 1 in regular operation at an operating site. The magnetic-inductive flowmeter 1 has a measuring tube 2, magnetic field generator 3 for generating a magnetic field 4, a Hall Effect sensor 5 and a control unit 6. In an alternative embodiment, the magnetic-inductive flowmeter 1 has a measuring coil instead of the Hall Effect sensor 5.

The magnetic field generator 3, itself, has a coil 7 and a yoke 8, and thus, forms an electromagnet. The coil 7 is wound around the yoke 8 in one section and the yoke 8 is made of a material having a lower magnetic resistance than the surroundings of the yoke 8, so that the magnetic field 4 generated by the coil current $i_S$ preferably propagates in the yoke 8. The yoke 8 is designed so that it forms a magnetic loop with an air gap, wherein the measuring tube 2 is arranged in the air gap. In FIG. 1, the magnetic field 4 in the air gap is only schematically shown. The magnetic field 4 permeates the measuring tube 2 and the second medium 9 flowing through the measuring tube 2, at least in part. Thereby, the direction of the magnetic field 4 is perpendicular to the direction of flow of the second medium 9, whereby an electric potential curve is induced in the second medium 9, whose direction is aligned perpendicular to the direction of the magnetic field 4 as well as perpendicular to the direction of flow of the second medium 9.

The wall of the measuring tube 2 is made of a material which is transparent for magnetic fields, i.e., does not influence the magnetic field 4. Two recesses are opposite one another in the wall of the measuring tube 2, wherein the first measuring electrode 10 is arranged in one recess/passage and the second measuring electrode 11 is arranged in the other recess/passage. The first measuring electrode 10 and the second measuring electrode 11 are in galvanic contact to the second medium 9. The induction voltage $u_I$ caused by the potential gradient in the second medium 9 is tapped between the first measuring electrode 10 and the second electrode 11 and is fed to the control unit 6.

The control unit 6 measures the induction voltage $u_I$ and determines, in this embodiment, the volume flow of the second medium 9 through the measuring tube 2 using the measuring induction voltage $u_I$ and the inner cross sectional area of the measuring tube 2, wherein the control unit 6 takes into account that the induction voltage $u_I$ is proportional to the flow velocity of the second medium 9 through the measuring tube 2 as well as to the magnetic flux density of the magnetic field 4 in the second medium 9.

In this embodiment, the magnetic field strength of the magnetic field 4 is deemed as the strength of the magnetic field 4. In order to measure the magnetic field strength, a sensor can be used that exploits the Hall Effect, which is why the Hall Effect sensor 5 is arranged in the magnetic field 4 in the air gap between the measuring tube 2 and the yoke 8. The Hall Effect sensor generates a measuring voltage $u_M$, which is proportional to the magnetic field strength of the magnetic field 4 that it is subject to. The measuring voltage $u_M$ is fed to the control unit 6. The control unit 6 measures the measuring voltage $u_M$ and then determines the magnetic field strength of the magnetic field 4 from the measured measuring voltage $u_M$.

The control unit 6, in this embodiment, is designed to apply the coil current $i_S$ with a constant amount to the coil 7 and to reverse the direction of the coil current $i_S$ after each of a plurality of inverting intervals. Thus, the magnetic field 4 is also reversed after each of the inverting intervals, which is why the magnetic field 4 is also called a switched or a clocked constant magnetic field. In this embodiment, the durations of the inverting intervals are the same. In another embodiment, the durations of the inverting intervals, however, are different from one another.

Figure 2:
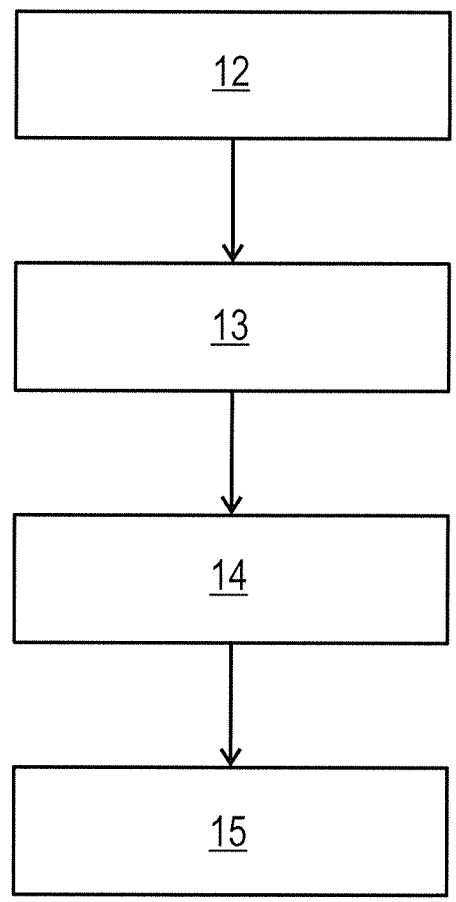

In the following, a method is described that exhibits the method steps described in the flow chart shown in FIG. 2.

The first method step 12 is not carried out during the regular operation of the magnetic-inductive flowmeter 1, but instead is performed during calibration of the magnetic-inductive flowmeter 1. In the first method step 12, the measuring tube 12 is completely filled with a first medium, wherein the first medium is, e.g., water and is stagnant in the filled measuring tube 2. Then, the strength of the magnetic field 4 is measured by the control unit 6 over a first measuring interval and a time derivative of the strength of the magnetic field 4 is determined for the first measuring interval.

The time derivative of the strength of the magnetic field 4 is a new characteristic curve of the magnetic-inductive flowmeter 1, which characterizes the magnetic-inductive flowmeter 1. It has been identified that deviations from the characteristic curve correspond to a zero flow error. Deviations from this characteristic curve occur during regular operation of the magnetic-inductive flowmeter 1, e.g., when properties of the yoke 8 change over time.

The method steps following the first method step 12, are carried out by the control unit 6 during regular operation of the magnetic-inductive flowmeter 1, while the measuring tube 2 has the second medium 9 flowing through it, which is also water, here. The first medium and the second medium 9 are identical in this embodiment, however, they can be different from one another.

In the second method step 13, the strength of the magnetic field 4 is measured over a second measuring interval and a derivative in respect to time of the measuring strength of the magnetic field 4 is determined for the second measuring interval.

In the third method step 14, a first derivative deviation of the derivative for the second measuring interval from the derivative for the first measuring interval is determined, in that a difference of the derivative for the second measuring interval from the derivative for the first measuring interval is formed.

In the fourth method step 15, the determined first derivative deviation is assigned a zero flow error. Additionally, a flow of the second medium 9 through the measuring tube 2 is measured during the second method step 13 in the second measuring interval and the measured flow is corrected by the zero flow error, in that the zero flow error is subtracted from the measured flow.

In the present method, the inverting intervals are constant, which means that their durations are constant. Both the first as well as the second measuring interval correspond each to an inverting interval. The time derivative of the measured strength of the magnetic field 4 for each of the first and the second measuring intervals is determined during the entire measuring interval.

What is claimed is:

1. Method for flow measurement using a magnetic-inductive flowmeter with a measuring tube and magnetic field generator, comprising:
   generating a magnetic field by the magnetic field generator and inverting the magnetic field at inverting intervals,
   filling the measuring tube with a first medium,
   measuring the strength of the magnetic field over a first measuring interval and determining a time derivative of the measured strength of the magnetic field for the first measuring interval,
   flowing a second medium through the measuring tube, measuring the strength of the magnetic field over a second measuring interval and determining a time derivative of the measured strength of the magnetic field for the second measuring interval,
   determining a first derivative deviation of the derivative for the second measuring interval from the derivative for the first measuring interval, and
   assigning the determined first derivative deviation as a zero flow error.

2. Method according to claim 1, wherein the first measuring interval and the second measuring interval each correspond to one of the inverting intervals.

3. Method according to claim 1, wherein a flow of the second medium through the measuring tube is measured in the second measuring interval and the measured flow is corrected by the zero flow error.

4. Method according to claim 1, wherein the strength of the magnetic field is measured in a third measuring interval and a time derivative of the measured strength of the magnetic field is determined for the third measuring interval, wherein a second derivative deviation of the derivative for the third measuring interval from the derivative for the first measuring interval is determined, wherein a flow of the second medium through the measuring tube is measured in the third measuring interval, and wherein the strength of the magnetic field is adjusted in the third measuring interval such that the second derivative deviation is at least reduced compared to the first derivative deviation.

5. Method according to claim 1, wherein the strength of the magnetic field is measured over a third interval and a time derivative of the measured strength of the magnetic field is determined for the third measuring interval,
   wherein a second derivative deviation of the derivative for the third measuring interval from the derivative for the first measuring interval is determined, and a flow of the second medium through the measuring tube is measured in the third measuring interval, a flow of a second medium through the measuring tube being measured in the second measuring interval and an average value determined from the flow measured in the second interval and the flow measured in the third interval, and
   wherein the strength of the magnetic field is adjusted in the third measuring interval such that the second derivative deviation corresponds to the inverted first derivative deviation.

6. Method according to 4, wherein the third measuring interval corresponds to a further one of the inverting intervals.

7. Method according to claim 1, wherein the inverting intervals are constant.

8. Method according to claim 1, wherein a magnetic field strength of the magnetic field is measured by a Hall Effect sensor and wherein the measured magnetic field strength is adopted as the strength of the magnetic field.

9. Method according to claim 1, wherein a magnetic field strength of the magnetic field is measured by a Hall Effect sensor and wherein the strength of the magnetic field is determined from the measured magnetic field strength.

10. Method according to claim 1, wherein a temporal change of a magnetic flux density of the magnetic field is measured by a measuring coil and wherein the measured temporal change of the magnetic flux density is adopted as a measurement of the strength of the magnetic field and as a derivative in respect to time of the strength of the magnetic field.

\* \* \* \* \*